United States Patent
Surazski et al.

(10) Patent No.: US 7,068,792 B1
(45) Date of Patent: Jun. 27, 2006

(54) ENHANCED SPATIAL MIXING TO ENABLE THREE-DIMENSIONAL AUDIO DEPLOYMENT

(75) Inventors: Lukasz K. Surazski, San Jose, CA (US); Pascal Hubert Huart, Dallas, TX (US); Michael Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 10/086,841

(22) Filed: Feb. 28, 2002

(51) Int. Cl.
*H04R 5/00* (2006.01)

(52) U.S. Cl. ............... 381/17; 379/202.01; 379/206.01

(58) Field of Classification Search .................. 381/17, 381/92; 379/202.01, 206.01
See application file for complete search history.

(56) References Cited

U.S. PATENT DOCUMENTS

| | | | | |
|---|---|---|---|---|
| 6,011,851 A | * | 1/2000 | Connor et al. | 381/17 |
| 6,125,115 A | * | 9/2000 | Smits | 370/389 |
| 6,813,360 B1 | * | 11/2004 | Gentle | 381/23 |
| 2003/0098892 A1 | * | 5/2003 | Hiipakka | 345/846 |
| 2003/0112947 A1 | * | 6/2003 | Cohen | 379/202.01 |

\* cited by examiner

*Primary Examiner*—Brian T. Pendleton
(74) *Attorney, Agent, or Firm*—Marger Johnson & McCollom, P.C.

(57) ABSTRACT

A network device and its mode of operation. The network device includes an input port through which audio streams may be received. A controller receives a user input indicating which type of mix the user wants applied to the audio stream and applies the mixing factor designated. The mixing factor may be a stereo mix, a panned mix, or a mono mix. The network device also includes an output port through which the mixed audio stream can be transmitted to the user.

26 Claims, 4 Drawing Sheets

ENHANCED SPATIAL MIXING TO ENABLE THREE-DIMENSIONAL AUDIO DEPLOYMENT

BACKGROUND

1. Field

This disclosure relates to telephony equipment, more particularly to methods and devices providing three-dimensional audio streams.

2. Background

Some telephone equipment may include 'three-dimensional' audio capabilities. Multiple audio streams are manipulated to locate each stream in a manner that will cause the user to interpret the streams as being spatially separated. For example, in a four-person conference call, the receiving equipment may manipulate the streams of the three speakers heard at the fourth person's end to 'place' one speaker to the listener's left, one to the right and one in the center. This type of manipulation typically allows the listener a better chance at comprehending the multiple streams and alleviates listener fatigue.

Generally, the three-dimensional (3D) audio stream consists of a stereo audio stream in which the left and right tracks are compositions of the original component streams transposed by psychoacoustically manipulating head-related transfer functions (HRTF). The HRTFs attempt to model a 3D environment such as a room and mainly attempt to reproduce reflections that would be heard in such an environment. HRTFs are commonly used and developed for consumer products in the home entertainment market, such as 'surround sound' systems for home theaters and stereos.

The use of this type of audio manipulation also occurs in telephonic or other non-entertainment areas. For example, U.S. Pat. No. 5,485,514, issued Jan. 16, 1996, addresses spatially separating a telephone audio stream into right and left streams for headphones, rather than for a one-speaker telephone handset commonly used. U.S. Pat. No. 5,682,196, issued Oct. 28, 1997, presents a system in which personalized audio feedback is provided to a viewer in an interactive television system. U.S. Pat. No. 6,011,851, issued Jan. 4, 2000, discloses an audio processing system in which various audio streams are spatially located at different points relative to the user, allowing the user to spatially separate the audio signals as they are comprehended.

However, a problem with current three-dimensional audio processing has been discovered. It generally occurs in systems where headphones are used, as opposed to point audio sources that are spatially located in front of the user such as those in the system discussed in the '851 patent. In about one-quarter of all users of three-dimensional audio systems, the front-back signal information used to spatially place audio streams is comprehended as in reverse. In these users, audio streams that are manipulated to place that audio stream to the front of the user are actually interpreted as coming from behind the user. Humans typically become uncomfortable and may even become alarmed by sounds coming from behind them. For 3D telephony applications, this is undesirable, as it increases listener fatigue and offsets the efficiency and advantages otherwise gained from conference calls and other multiple audio stream applications.

SUMMARY

One embodiment of the invention is a network device having audio mixing capabilities. The network device includes an input port to receive incoming audio streams and a controller. The controller is operable to receive a user input and apply a mixing factor to the incoming audio streams depending upon the user input. The mixing factor may be a mono factor, providing a mono audio stream. The mixing factor may be a HRTF, providing a spatial mix to the user, or a pan factor, providing a panned mix to the user. The user is provided with a means to select, either during call set up or in real-time, the mix that user finds the most comfortable.

BRIEF DESCRIPTION OF THE DRAWINGS

The invention may be best understood by reading the disclosure with reference to the drawings, wherein.

DETAILED DESCRIPTION OF THE EMBODIMENTS

Figure 2:
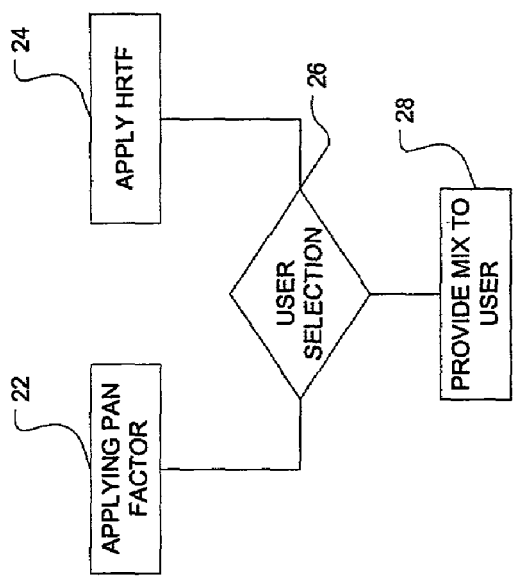
FIG. 2 shows a flowchart of an embodiment of a method to provide spatially mixed audio streams to a user, based upon a user preference, in accordance with the invention.

The advent of voice over data network traffic has given rise to equipment with high levels of processing capabilities used in transmission of voice over data network calls, such as Voice over Internet Protocol (VoIP). Some of this equipment translates between the data network protocols, such as IP, and the typical, end user equipment such as traditional telephones that sit on user's desks. In some instances, however, the end user equipment is also sophisticated and may allow the network equipment to utilize more of its processing power to provide better service to the end user.

For example, if the end user equipment is not a traditional telephone but is instead a computer or workstation, equipped with stereo headphones, the network equipment may provide the user with a stereo audio transmission. In addition, the network equipment may provide what is referred to as 'three-dimensional' (3-D) audio. In 3-D audio, the incoming audio streams, such as those associated with a conference call, are manipulated to allow the user to perceive the audio streams as being spatially separated. For example, in a four-person conference call, a participant may perceive the other three users as being situated to that participant's left, directly in front of the participant, and to the participant's right, based upon the audio signals. This manipulation is generally performed at a network device in the path of the call, such as a conference bridge.

In current implementations, the conference bridge receives several incoming audio streams for the call. In the example of the four-person conference call, three incoming audio streams would be received at the conference bridge to be presented to the user as one stream. Each component audio stream, i, is decoded into a decode buffer, $D_i$. Each endpoint in the conference will have associated with it a head-related transfer function (HRTF), which, when applied, will transform the audio streams into a left-side audio stream and a right-side audio stream. Generally HRTFs have a left transfer function, $H_l$, and a right transfer function, $H_r$. These are applied to the audio stream and the results are then placed in buffers $D_{ri}$ and $D_{li}$. In the example above, there would be four right-side buffers, $D_{r1}$ through $D_{r4}$, and four left-side buffers, $D_{l1}$ through $D_{l4}$.

A right-side mix of the participants is created by summing all of the contents of each right-side buffer into a mix $M_r$. Similarly, a left-side mix of all of the participants is created by summing all of the left-side buffers into a mix $M_l$. A mix of all of the incoming audio streams results from a summing of all of the $D_i$ buffers into a mix $M_m$. Once all of these various mixes are available, the system then provides the proper mix to the user. If the endpoint has stereo capabilities, the mix provided may be $\{M_l\text{-}D_{li}; M_r\text{-}D_{ri}\}$. If the endpoint does not have stereo capabilities, the audio stream of $M_m\text{-}D_i$ is provided. It should be noted that this is essentially the entire audio stream, minus the audio stream originating from that user's end point. For example, User 1, located at endpoint 1, will receive the entire mix minus the audio signals from endpoint 1.

As discussed previously, however, this type of mixing can result in a perceived inversion of the origination of the sound. In approximately one-quarter of listeners, the perception resulting from this type of mixing is that the sounds are coming from behind them. This can increase listener fatigue and be generally disorienting for the listeners. Embodiments of this invention attempt to prevent that by performing further processing to produce panned audio signals, rather than just stereo audio signals.

Figure 1:
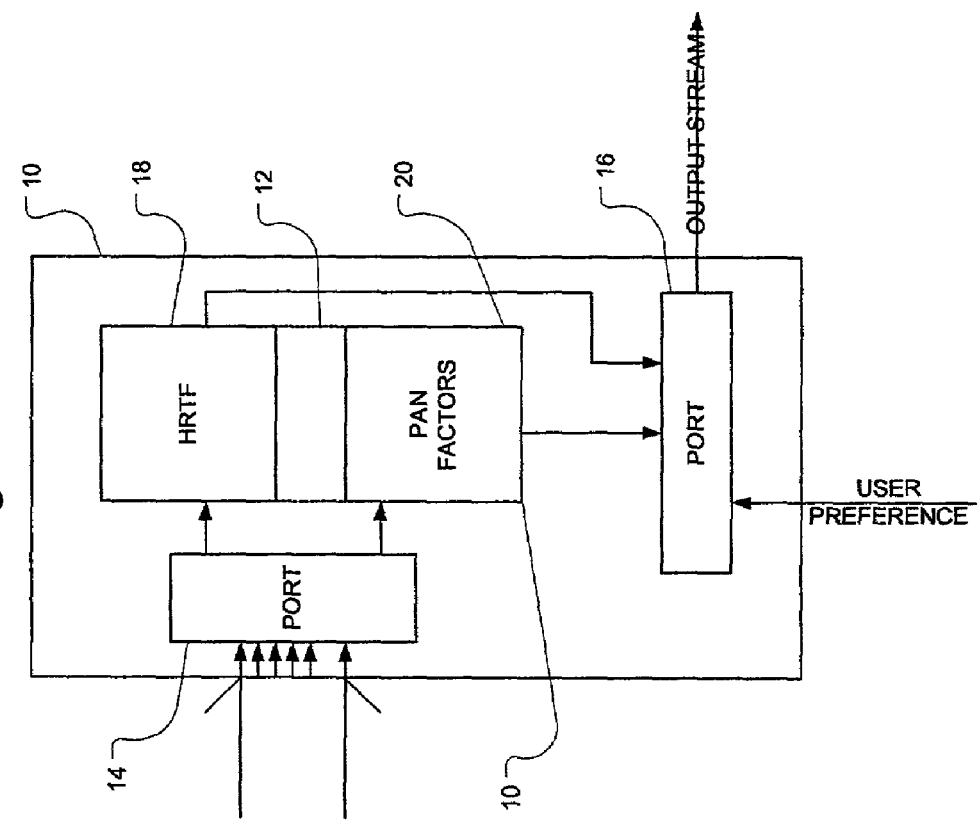
FIG. 1 shows an embodiment of a network device, in accordance with the invention.

One embodiment of a network device capable of providing stereo and panned audio streams is shown in FIG. 1. The device 10 has a controller 12, an input port 14 and an output port 16. The input and output ports may not actually be separate ports, but may use the same wires and connectors, but are shown as separated for ease of discussion. The controller 12 may apply a mixing factor to produce the output audio stream. The mixing factor may be the HRTFs 18 discussed above, pan factors 20, which will be discussed in more detail later, or a mono-mixing factor for end user equipment that does not have stereo capabilities.

Generally, the device operates upon the incoming audio streams to produce the desired output audio stream for a given endpoint. The nature of the operation depends upon a user input. The user input may be received with the input audio stream from that endpoint, although it is shown as a separately received signal in FIG. 1. A general embodiment of a method of operating the network device is shown in FIG. 2.

At 22, the pan factor is applied to the incoming audio stream, as will be discussed in more detail with regards to FIGS. 3–5. Similarly, the HRTF is applied at 24. The user preference is then used to select whether the user wants to hear a spatial mix, which results from the HRTF application, or a panned mix, which results from the pan factor application. Alternatively, the system could wait until the user has made a selection before applying either factor. However, if the user wants to switch between the two resulting audio streams in real-time, this may introduce an undesirable delay in the buffering and transmitting of the audio stream and result in missed parts of the conference call. Once the user has made the selection, that mix is provided to the user. For purposes of discussion, application of the factors will be shown as being accomplished prior to the user selection, with the understanding that it could be done after.

The user input received at 26 may also be received prior to the application of either the HRTF or the pan factor, but not acted upon until after the applications. Similarly, the user input could be a real-time input received from the user during the course of a call. This would probably be done on a graphical user interface on the user's end equipment or through a push button. The current state of the user preference may be maintained in a user profile. The profile could be set up as the user makes selections in real time, may be produced automatically based upon the equipment profile of the end equipment, or may be set up during the set up of the call, based either upon the equipment or a user interface.

Figure 3:
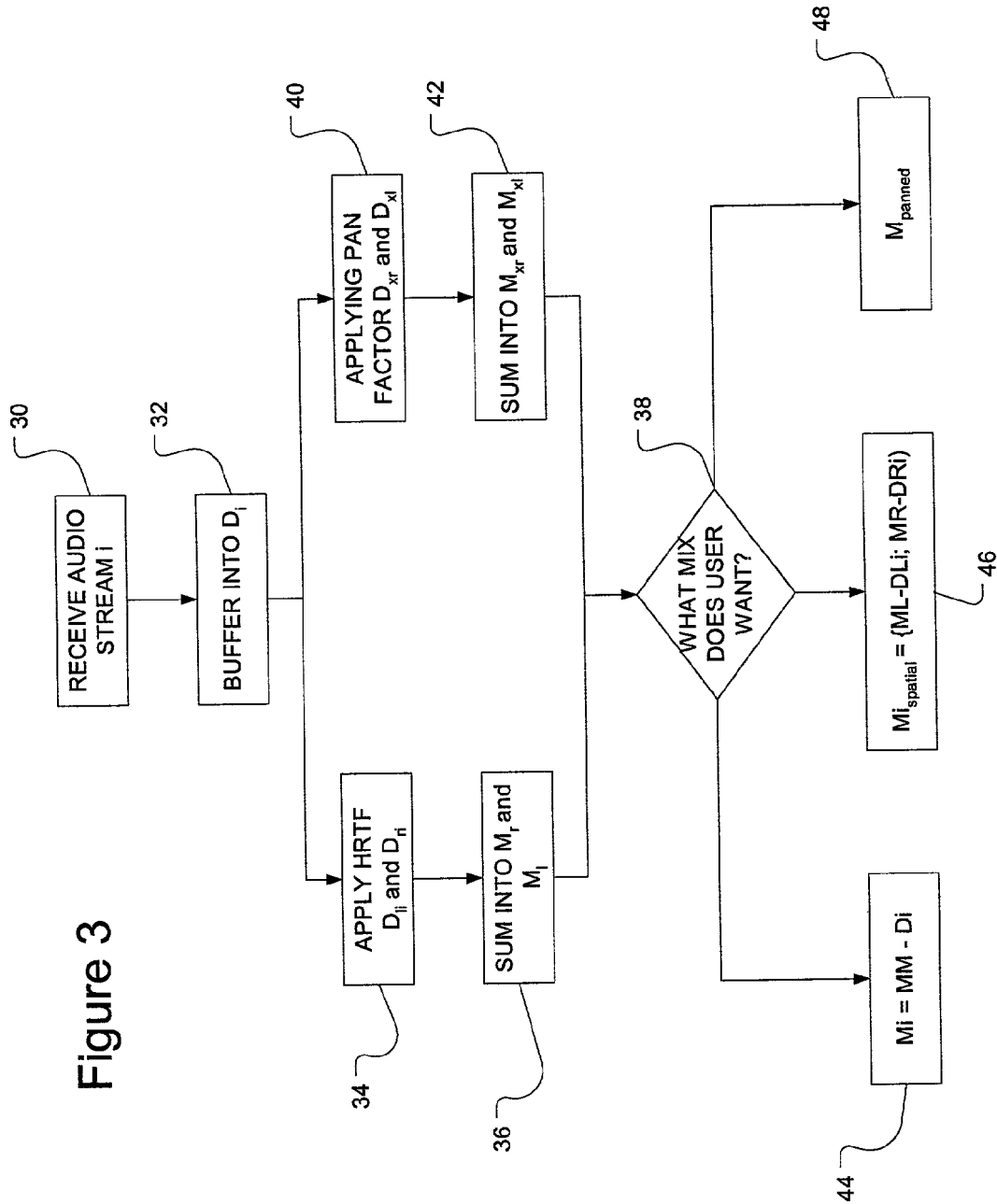
FIG. 3 shows a flowchart of a general embodiment of a method to provide mixed audio to a user, in accordance with the invention.

FIG. 3 show one embodiment of a method to provide appropriately mixed audio streams to users. The incoming audio streams are received at 30. Each stream is buffered into the appropriate buffer $D_i$. The HRTF for a particular endpoint is applied to that endpoint's buffer at 34, resulting in left and right side buffers $D_{li}$ and $D_{ri}$ for each endpoint. Each of these 'sided' buffers is then summed into a right-side mix $M_r$ and a left-side mix $M_l$. Additionally, either in parallel with the application of the HRTF, or before or after, a pan factor X is applied to the buffer $D_i$, resulting in pan buffers, $D_{xr}$ and $D_{xl}$ at 40. These are then summed into panned sided buffers $M_{xr}$ and $M_{xl}$. At 38, the determination is made as to which mix the user desires. The mix may be mono, as shown at 44, spatial resulting from the HRTF application at 46 or the panned mix resulting from application of the pan factor at 48. The HRTF and the pan factors will be referred to collectively as 'mixing' factors.

The pan factors applied may be a positional factor or a weighted pan factor. One embodiment of application of a positional pan factor is shown in FIG. 4. In this particular example, there are i participants. The first two participants 1 and 2 have been set forth only to allow better understanding of the invention. The audio stream designated as audio stream 1 is assigned a left positional factor P=L at 40*a*. The audio stream designated as audio stream 2 is also assigned a left positional factor P=L at 40*b*. The ith audio stream is assigned a right positional factor P=R at 40*c*.

The HRTF are applied as before resulting in the buffers $D_{l1}$ and $D_{r1}$ at 44*a* and 46*a*, and the sided buffers ML and MR at 52 and 54. Similar operations are performed for each of the other streams. Additionally, all of the audio streams have a positional factor of L have their buffers $D_i$ summed into the positional buffer MPL at 48. Similarly, all right positional factors R are summed into the positional buffer MPR at 50. The resulting mix buffers are: MPL and MPR, sums of the audio buffers for endpoints with a particular positional factor; ML and MR, sided buffers for each of the buffers resulting from the application of the HRTF; and MM, the sum of all of the audio buffers.

Depending upon the mix desired by the user, the system could now produce the appropriate mix. For a mono mix, the sum of all buffers minus the buffer for the particular endpoint is produced. A spatial mix can be produced from the sum of the sided buffers, ML and MR, minus the sided buffer for the particular endpoint, $D_{li}$ and $D_{lr}$. In addition, a panned mix can be produced for each endpoint, dependent upon the positional factor for that endpoint. For an endpoint having a positional factor equal to left, P=L, the mix provided will comprise the sum of all of the buffers have the right positional factor, MPR, and the summed left positional factor buffers minus the current endpoint's audio stream from the buffer $D_i$. For endpoints with a positional factor equal to right, P=R, the mix provided may comprise the sum of all buffers having left positional factors, MPL, and the sum of all buffers having right positional factors, MPR, minus the audio buffer for that particular endpoint.

In this manner, a new mix is made available to the user as a panned mix that does not have the objectionable depth information that the user may find uncomfortable as in the stereo HRTF mix. The panned mix may have a positional factor as described above, or a weighted factor, as shown in FIG. 5. Referring back to FIG. 3, in the case of a positional factor, the resulting mixes MPL and MPR take the place of the pan buffers $M_{xr}$ and $M_{xl}$. In FIG. 5, the weighted buffers MWL and MWR are the analogous mixes.

In applying the weighted factors, the positioning of the speakers in the sonic landscape is more graduated than just a left position or a right position. A value of 0 may be assigned to the extreme right or the left, with the opposite extreme being the other. For purposes of our discussion here, right will be assumed to be 1 and left will be assumed to be 0. Each audio stream is then assigned a weight between 0 and 1 to indicate its position. As can be seen in FIG. 5, this results in intermediate buffers DWLi and DWRi at 45*a–c* and 47*a–c*, respectively. These are also summed into weighted buffers MWL at 64 and MWR at 66, where MWL is a summation of all of the buffers DWLi and MRL is a summation of all of the buffers DWRi.

Figure 4:
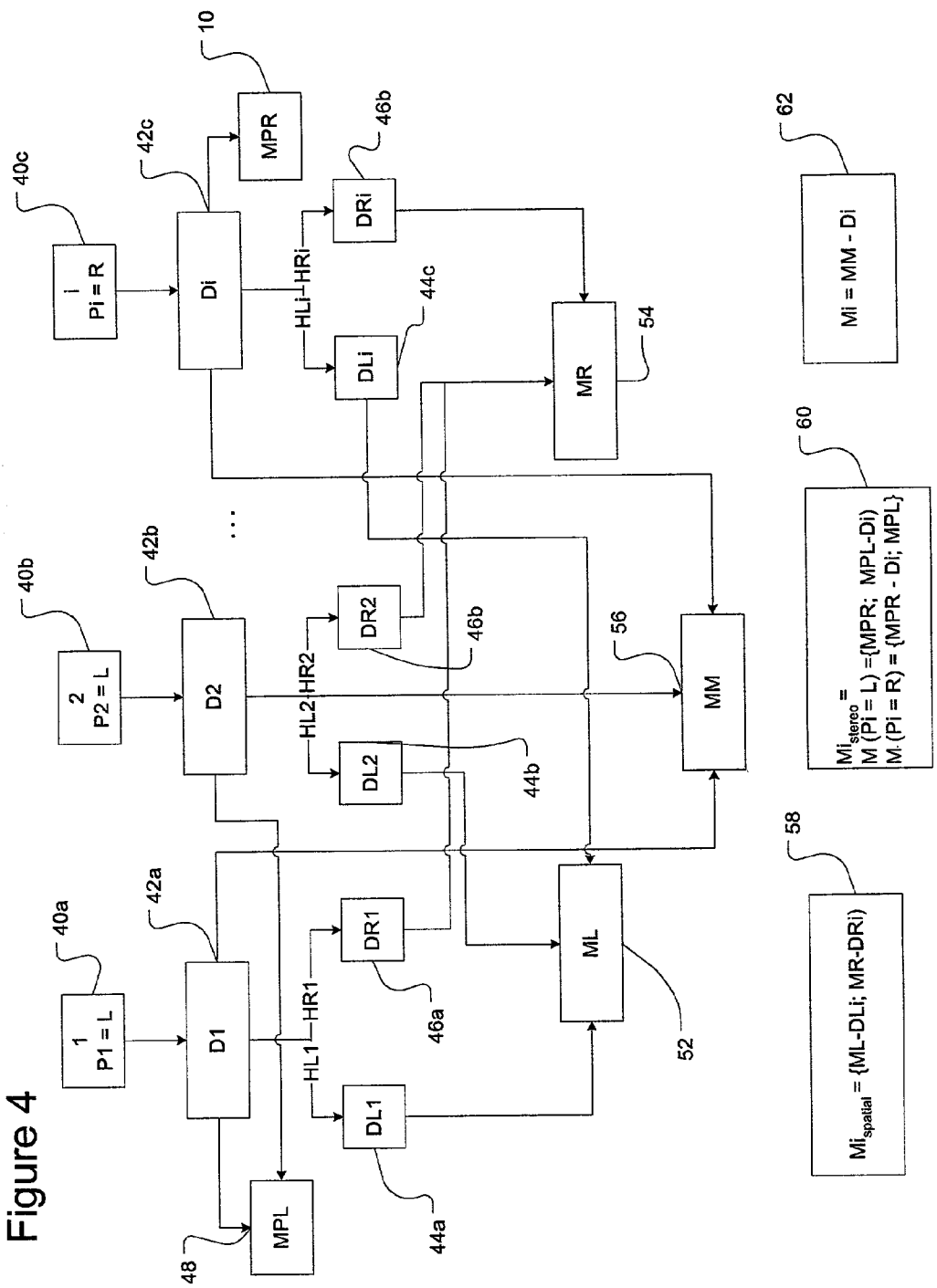
FIG. 4 shows a flowchart of an embodiment of a method to provide panned mixed audio to a user, in accordance with the invention.
Figure 5:
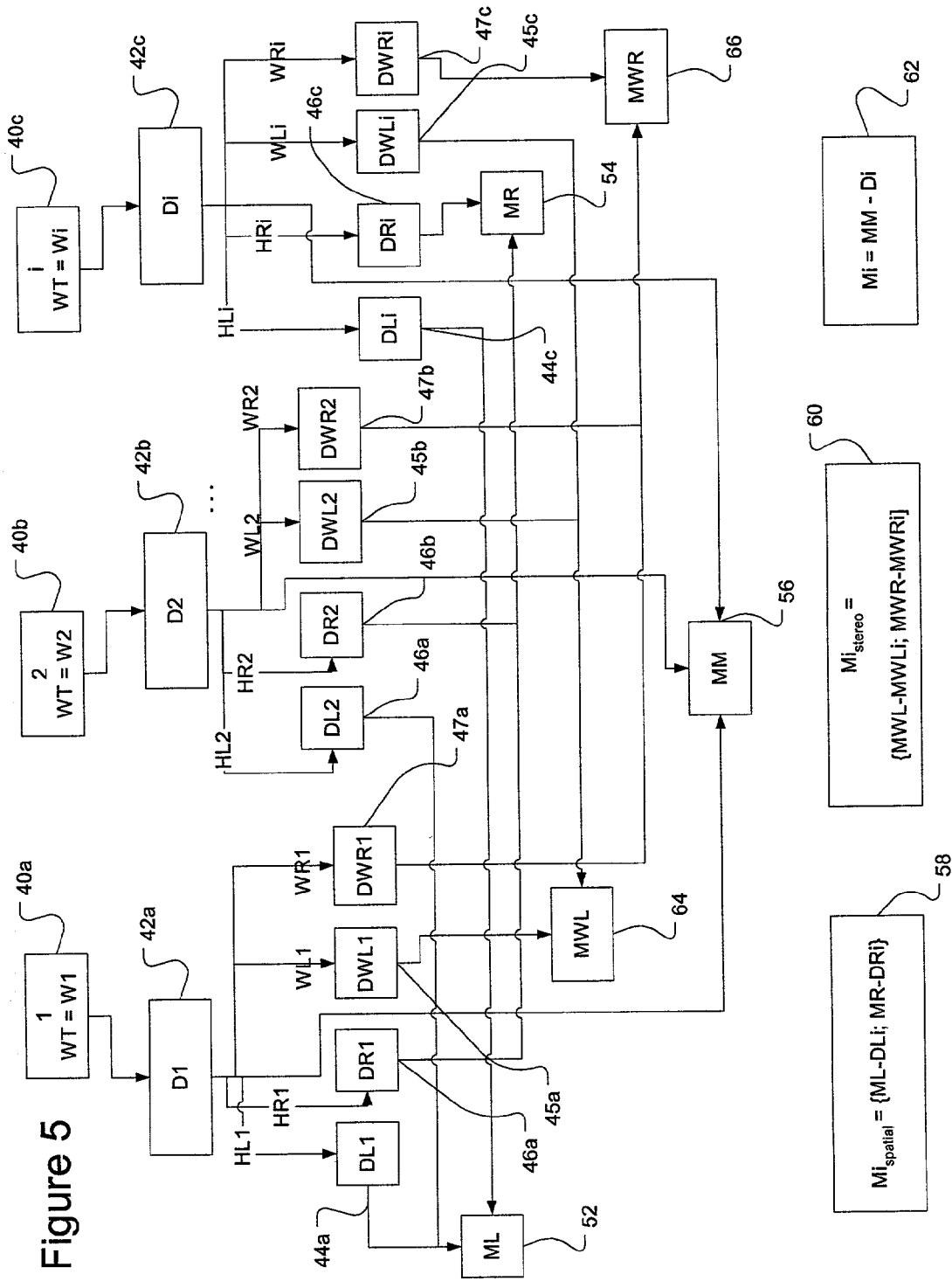
FIG. 5 shows a flowchart of an alternative embodiment of a method to provide panned mixed audio to a user, in accordance with the invention.

In this embodiment, the mix for the mono and the spatial remain the same as in FIG. 4, as shown at 58 and 62. However, the panned mix in this embodiment comprises MWL minus the weighted buffer DWLi for that endpoint, and mix MWR minus the weighted buffer DWRi for that endpoint. This embodiment provides a more graduated and possibly more easily spatially separable audio stream but uses more computing power.

In this manner, users will be able to select between the stereo HRTF mode and the panned mode. This will prevent user discomfort while still allowing the user to spatial separable audio streams.

Thus, although there has been described to this point a particular embodiment for a method and apparatus for providing an appropriately mixed audio stream, it is not intended that such specific references be considered as limitations upon the scope of this invention except in-so-far as set forth in the following claims.

What is claimed is:

1. A network device, comprising:
    an input port to receive incoming audio streams;
    a controller to:
    receive a user input; and
    apply a head-related transfer function mixing, a mono mixing and a panned mixing to the incoming audio streams;
    using the user input to select between the head-related transfer function mixing, the mono mixing and the panned mixing to produce an output audio stream; and
    an output port operable to transmit the output audio stream.

2. The network device of claim 1, wherein the network device further comprises a conference bridge.

3. The network device of claim 1, wherein the user input further comprises a real-time user input.

4. The network device of claim 1, wherein the user input further comprises a previously existing user profile.

5. The network device of claim 1, wherein the mixing selected comprises a head related transfer function mixing.

6. The network device of claim 1, wherein the mixing selected comprises a pan mixing.

7. The network device of claim 6, wherein the pan factor is one of the group comprised of: a positional factor and a weighted factor.

8. The network device of claim 1, wherein the mixing selected further comprises a mono-mixing factor.

9. A method of providing audio streams to a user, the method comprising:

receiving an incoming audio stream;
applying a head-related transfer function mixing, a mono-mixing and a panned mixing to the incoming audio stream;
using a user input to select between the head-related transfer function mixing, the mono-mixing and the panned mixing, to produce an output audio stream; and
transmitting the output audio stream to the user.

10. The method of claim 9, wherein using a user input to select further comprises selecting the head related transfer function mixing.

11. The method of claim 9, wherein using a user input to select further comprises selecting the pan mixing.

12. The method of claim 9, wherein using a user input to select further comprises selecting the mono-mixing.

13. The method of claim 9, wherein the user input is received in real-time.

14. The method of claim 9, wherein the user input is received from a user profile during call set up.

15. The method of claim 9, wherein the user input is received automatically from equipment at an endpoint of the user.

16. A network device, comprising:
    a means for receiving incoming audio streams;
    a means for receiving a user input;
    a means for applying a head-related transfer function mixing, a mono mixing, and a panned mixing to the incoming audio streams;
    a means for selecting between the head-related transfer function mixing, the mono mixing and the panned mixing to produce and output audio stream; and
    a means for transmitting the output audio stream.

17. The network device of claim 16, wherein the network device further comprises a conference bridge.

18. The network device of claim 16, wherein the means for receiving the user input further comprises a user interface.

19. The network device of claim 16, wherein the means for applying a mixing factor further comprises a controller.

20. An article containing machine readable code that, when executed, causes the machine to:
    receive an incoming audio stream;
    apply a head-related transfer function mixing, a mono-mixing and a panned mixing to the incoming audio stream;
    using a user input to select between the head-related transfer function mixing, the mono-mixing and the panned mixing, to produce an output audio stream; and
    transmit the output audio stream to the user.

21. The article of claim 20, wherein the mixing selected further comprises the head related transfer function mixing.

22. The article of claim 20, wherein the mixing selected further comprises the pan mixing.

23. The article of claim 20, wherein the mixing selected further comprises the mono-mixing.

24. The article of claim 20, wherein article contains further code that, when executed, causes the user input to be received in real-time.

25. The article of claim 20, wherein article contains further code that, when executed, causes the user input to be received from a user profile during call set up.

26. The article of claim 20, wherein the article contains further code that, when executed, queries equipment at an endpoint of the user to determine the user input.

* * * * *